US012062351B2

(12) United States Patent
Wu et al.

(10) Patent No.: US 12,062,351 B2
(45) Date of Patent: Aug. 13, 2024

(54) DISPLAY DEVICE WITH CURVATURE DISPLAY PORTION

(71) Applicant: InnoLux Corporation, Miao-Li County (TW)

(72) Inventors: Yuan-Lin Wu, Miao-Li County (TW); Kuan-Feng Lee, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/208,304

(22) Filed: Jun. 11, 2023

(65) Prior Publication Data

US 2023/0326428 A1 Oct. 12, 2023

Related U.S. Application Data

(63) Continuation of application No. 17/876,557, filed on Jul. 29, 2022, now Pat. No. 11,710,466, which is a continuation of application No. 17/189,282, filed on Mar. 2, 2021, now Pat. No. 11,423,865.

(30) Foreign Application Priority Data

Mar. 24, 2020 (CN) ......................... 202010211613.5

(51) Int. Cl.
*G09G 5/14* (2006.01)
*G09G 3/00* (2006.01)
*G09G 5/10* (2006.01)

(52) U.S. Cl.
CPC ................. *G09G 5/14* (2013.01); *G09G 5/10* (2013.01); *G09G 3/035* (2020.08); *G09G 2310/0267* (2013.01); *G09G 2310/0275* (2013.01); *G09G 2320/0686* (2013.01); *G09G 2330/023* (2013.01)

(58) Field of Classification Search
CPC ........................................................ G09G 5/14
See application file for complete search history.

(56) References Cited

U.S. PATENT DOCUMENTS

| | | | | |
|---|---|---|---|---|
| 2015/0287383 | A1 | 10/2015 | Kim | |
| 2018/0330671 | A1 | 11/2018 | Kim | |
| 2019/0179590 | A1* | 6/2019 | Jeong | G06F 3/1431 |
| 2021/0034107 | A1* | 2/2021 | Therien | G06F 3/14 |

FOREIGN PATENT DOCUMENTS

| | | | |
|---|---|---|---|
| CN | 1673820 | A | 9/2005 |
| CN | 106504645 | A | 3/2017 |

* cited by examiner

*Primary Examiner* — Gustavo Polo
(74) *Attorney, Agent, or Firm* — Winston Hsu

(57) ABSTRACT

A display device is provided, the display device includes a first display portion having a first surface, a second display portion having a second surface not in a same plane with the first display portion, a side display portion having a third surface connected between the first display portion and the second display portion. A main body, wherein the first display portion, the second display portion and the side display portion are disposed on the main body, the first surface, the second surface and the third surface have a normal respectively, and the normal of the first surface, the normal of the second surface and the normal of the third surface face different directions respectively, and an end portion of the main body includes a curved shape.

11 Claims, 10 Drawing Sheets

DISPLAY DEVICE WITH CURVATURE DISPLAY PORTION

CROSS REFERENCE TO RELATED APPLICATIONS

This application is a continuation application of U.S. application Ser. No. 17/876,557, filed on Jul. 29, 2022, which is a continuation application of U.S. application Ser. No. 17/189,282, filed on Mar. 2, 2021. The contents of these applications are incorporated herein by reference.

BACKGROUND OF THE DISCLOSURE

1. Field of the Disclosure

The present disclosure relates to a display device, in particular to a wraparound display device with a segmented display function.

2. Description of the Prior Art

Wraparound display devices are gradually used in electronic products, such as mobile phones and tablet computers. Its main feature is that the front of electronic device (such as mobile phone) has a normal display screen, while the side or back of electronic device also has a display screen, which can be used as reminder or other functions.

However, compared with traditional display devices (such as mobile phones with only one screen), wraparound display devices have a larger screen (which may be at least twice as large as traditional display devices) and consume more power. Therefore, how to reduce the power consumption of wraparound display device is one of the important goals of developing wraparound display device technology.

SUMMARY OF THE DISCLOSURE

A display device is provided, the display device includes a first display portion having a first surface, a second display portion having a second surface not in a same plane with the first display portion, a side display portion having a third surface connected between the first display portion and the second display portion. A main body, wherein the first display portion, the second display portion and the side display portion are disposed on the main body, the first surface, the second surface and the third surface have a normal respectively, and the normal of the first surface, the normal of the second surface and the normal of the third surface face different directions respectively, and an end portion of the main body includes a curved shape.

The present disclosure is characterized in that the display panel is divided into different portions, for example, at least a first display portion and a second display portion, and the different display portions have the function of sectional display state, that is, one of them operates in a display mode (for example, a normal display state), while the other operates in a power saving mode (for example, closing the picture, giving low gray level or zero gray level, reducing the update frequency, etc.). Therefore, the power consumption of the whole display panel can be effectively reduced.

These and other objectives of the present disclosure will no doubt become obvious to those of ordinary skill in the art after reading the following detailed description of the embodiment that is illustrated in the various figures and drawings.

DETAILED DESCRIPTION

Figure 1:
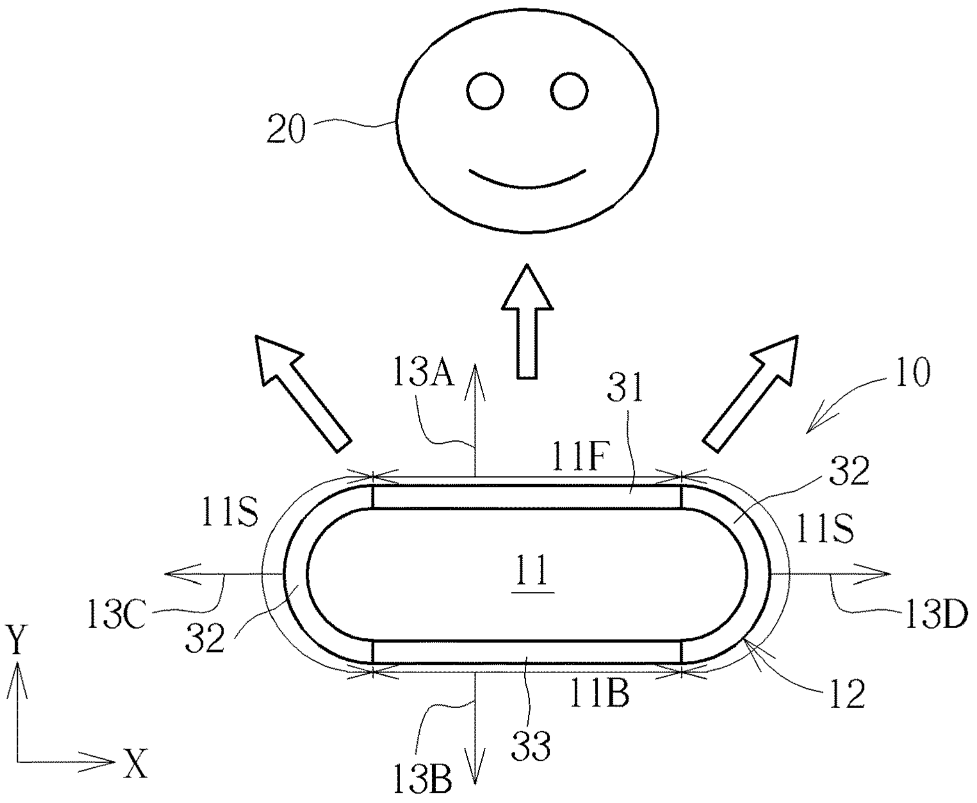
FIG. 1 shows a schematic cross-sectional view of a display device according to a first embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of an electronic device (i.e. a display device in this disclosure), and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms “include”, “comprise” and “have” are used in an open-ended fashion, and thus should be interpreted to mean “include, but not limited to . . . ”. Thus, when the terms “include”, “comprise” and/or “have” are used in the description of the present disclosure, the corresponding features, areas, steps, operations and/or components would be pointed to existence, but not limited to the existence of one or a plurality of the corresponding features, areas, steps, operations and/or components.

It will be understood that when an element or layer is referred to as being “(electrically) connected to” another element or layer, it can be directly (electrically) connected to the other element or layer, or intervening elements or layers may be presented. In contrast, when an element is referred to as being “directly (electrically) connected to” another element or layer, there are no intervening elements or layers presented. In contrast, when an element is referred to as being “disposed on” or “formed on” A element, it may be directly disposed on (or formed on) A element, or may be indirectly disposed on (or formed on) A element through other component. In contrast, when an element is referred to as being “disposed between” A element and B element, it may be directly disposed between A element and B element, or may be indirectly disposed between A element and B element through other component.

The terms “about”, “substantially”, “equal”, or “same” generally mean within 20% of a given value or range, or mean within 10%, 5%, 3%, 2%, 1%, or 0.5% of a given value or range.

In addition, the phrase “in a range from a first value to a second value” indicates the range includes the first value, the second value, and other values in between.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present disclosure.

FIG. 1 shows a schematic cross-sectional view of a display device according to a first embodiment of the present disclosure. The display device 10 of this embodiment has two main parts: a main body 11 and a display panel 12, the display panel 12 covers the periphery of the main body 11. In this embodiment, the display panel 12 can cover different surfaces of the main body 11 (for example, the front surface 11F, the back surface 11B and the two side surfaces 11S of the main body), each surface is not located on the same plane. In this disclosure, if the normals of two surfaces face different directions, the two surfaces are defined as disposing on different planes. Therefore, the front surface 11F, the back surface 11B and the two side surfaces 11S have their normals (that is, the normal 13A of the front surface 11F, the normal 13B of the back surface 11B, and the normal 13C and 13D of the two side surfaces 11S shown in FIG. 1) facing different directions, so the front surface 11*f*, the back surface 11B and the two side surfaces 11S are defined as disposing on different planes. In other embodiments, the display panel 12 may cover more or less surfaces of the main body portion 11. For example, when the display device 10 is a mobile phone, the display panel 12 may cover the front side, the back side and the upper, lower, left and right sides of the mobile phone. That is to say, each surface covered by the display panel 12 can have a display function. At this time, the display device 10 is also referred to as a wraparound display device. In addition, in other embodiments, the display panel 12 may cover the main body 11 without limiting four sides of the main body 11, such as one side, two sides and three sides of the main body 11, or when the main body 11 has more sides, it may also cover more than four sides. If the display panel 12 has at least two surfaces on different planes, it is within the scope of this disclosure.

In some embodiments, the display device 10 is, for example, a mobile phone, and the display panel 12 is a flexible panel surrounding the outer surface of the mobile phone. The material of the substrate of the display panel 12 may include glass, copper foil, polyimide (PI), polycarbonate (PC), polyethylene naphthalate (PEN), triacetate (TAC), epoxy resin or their combination, but is not limited thereto. The main body 11 is the rest of the components of the mobile phone including, for example, a casing, a processor, a battery, a touch device, and the like. As the related technologies of mobile phones and flexible panels are all known technologies in the field, they will not be described in detail here.

Figure 2:
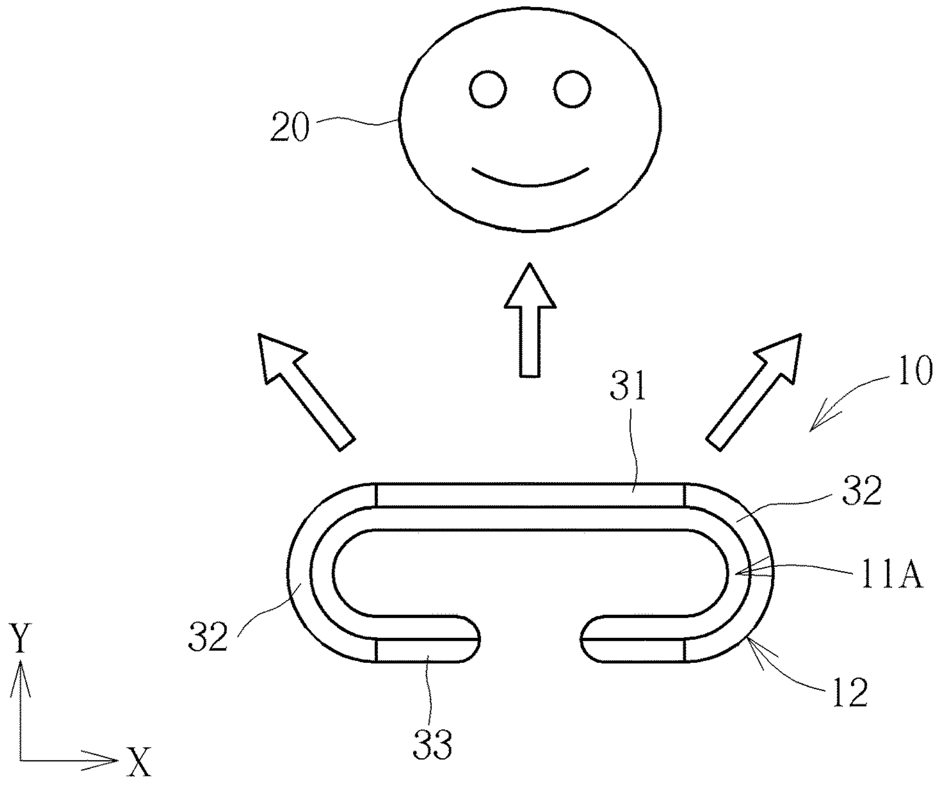
FIG. 2 shows a schematic cross-sectional view of a display device according to another embodiment of the present disclosure.

FIG. 2 shows a schematic cross-sectional view of a display device according to another embodiment of the present disclosure. In some embodiments of this disclosure, the main body 11 may also be a soft component. For example, when applied to products such as e-paper or bendable electronic devices, the main body 11A will be bent together with the display panel 12. Therefore, the main body 11 described in this disclosure is not limited to solid or soft components, and all the above embodiments are within in this disclosure.

Because the wraparound display device has a larger screen ratio, its power consumption is also larger than that of the traditional display device. The present disclosure is characterized in that the display panel 12 is divided into at least two different display portions, and when the display device 10 is turned on, at least one display portion is in a power saving mode. That is, the power consumption of the entire display device 10 can be reduced. As shown in FIG. 1 or FIG. 2, in this embodiment, the display panel 12 can be divided into a front display portion 31 (corresponding to the front face 11F), a back display portion 33 (corresponding to the back face 12B) and two side display portions 32 (corresponding to the side faces 11S). At this time, the front display portion 31 and the two side display portions 32 are in normal display mode (for example, the screen is on, which can be operated by the user or watched by the user), while the back display portion 12B which cannot be seen by the user is operated in a power saving mode (for example, the screen is turned off or the brightness is low). Different display portions of the same display panel have different display performances, which are defined as “sectional display state” in this disclosure.

Figure 3:
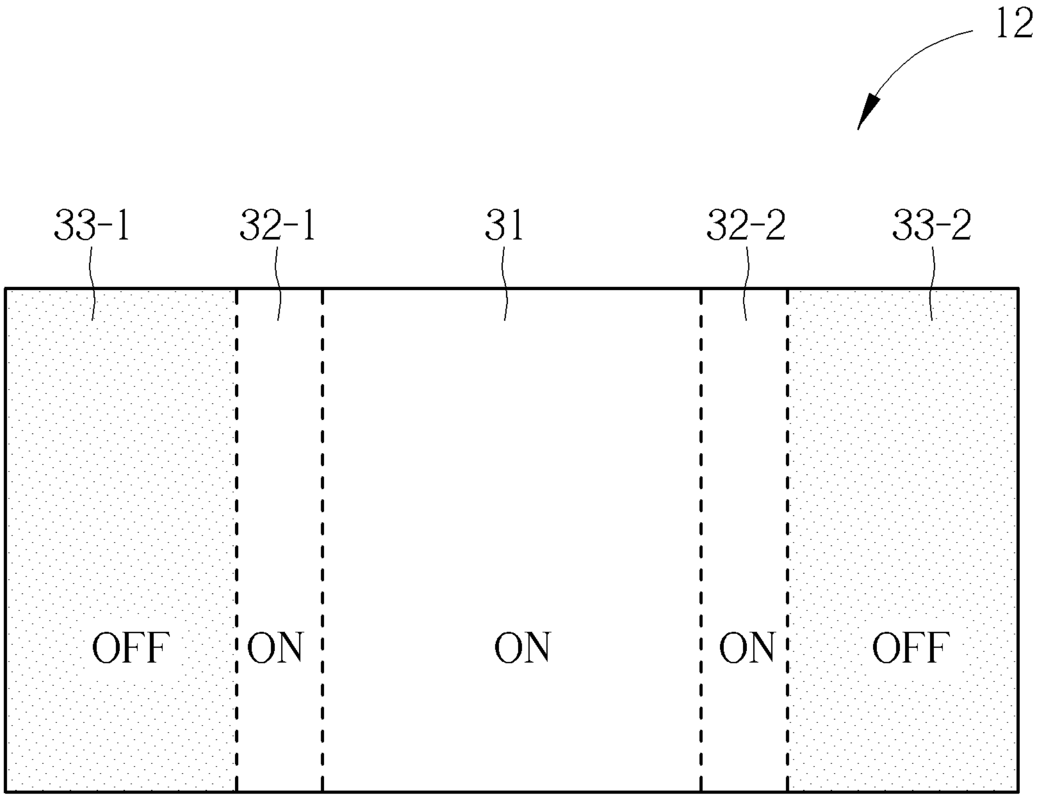
FIG. 3 and FIG. 4 are schematic diagrams showing the sectional display state of the display panel in other embodiments of the present disclosure.
Figure 4:
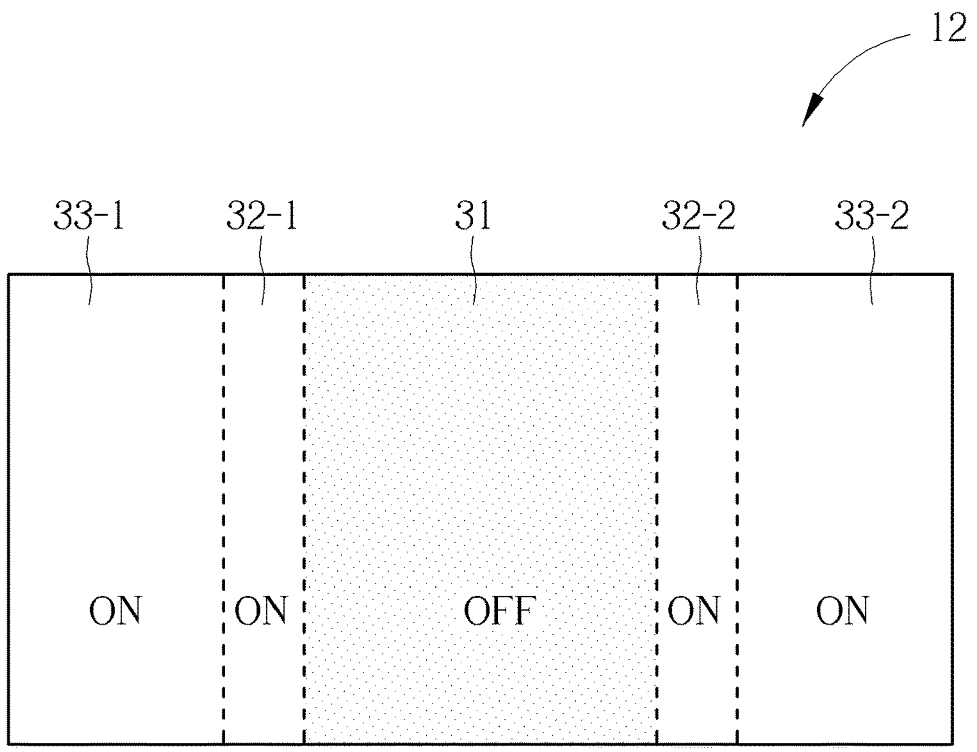

FIG. 3 and FIG. 4 are schematic diagrams showing the sectional display state of the display panel 12 in other embodiments of the present disclosure, and FIG. 3 and FIG. 4 illustrate different display portions of the display panel 12 in an unfolded view. As shown in FIG. 3, the display panel 12 includes a front display portion 31, a side display portion 32-1 and a side display portion 32-2, and a back display portion 33-1 and a back display portion 33-2, corresponding to the front face, side faces and back face of a display device (such as a mobile phone). It is worth noting that although the display panel 12 is divided into a plurality of display portions, in this disclosure, the display panel 12 is an integrally formed structure. That is to say, in this disclosure, the front display portion 31, the side display portion 32-1, the side display portion 32-2, the back display portion 33-1 and the back display portion 33-2 are at least connected with each other, and can form a large-area display panel 12 together.

In the embodiment of FIG. 3, the front display portion 31, the side display portion 32-1 and the side display portion 32-2 operate in a display mode (indicated by “ON” in FIG. 3); while the back display portion 33-1 and the back display portion 33-2 operate in a power saving mode (indicated by “OFF” in FIG. 3). In FIG. 4, the back display portion 33-1, the back display portion 33-2, the side display portion 32-1 and the side display portion 32-2 operate in a display mode (indicated by “ON” in FIG. 4); while the front display portion 31 operates in a power saving mode (indicated by “OFF” in FIG. 4).

In addition to the above FIG. 3 and FIG. 4, the side display portion 32-1 and the side display portion 32-2 can be turned OFF according to requirements. Therefore, in this disclosure, the display panel 12 can be simply divided into a first display portion and a second display portion, the first display portion and the second display portion have different display performances, and the first display portion and the second display portion are located on different planes. The following is an example: if the first display portion operates in the display mode, the second display portion operates in the power saving mode. On the contrary, if the first display portion operates in the power saving mode, the second display portion operates in the display mode. According to various embodiments of the present disclosure, the first display portion and the second display portion may include the following combinations (refer to FIG. 3 and FIG. 4):

(1) If the first display portion comprises the front display portion 31, the side display portion 32-1 and the side display portion 32-2; the second display portions comprises the back display portion 33-1 and the back display portion 33-2.

(2) If the first display portion comprises the front display portion 31, the second display portions comprises the back display portion 33-1, the back display portion 33-2, the side display portion 32-1 and the side display portion 32-2.

(3) If the first display portion comprises the back display portion 33-1, the back display portion 33-2, the side display portion 32-1 and the side display portion 32-2, the second display portion comprises the front display portion 31.

(4) If the first display portion comprises the back display portion 33-1 and the back display portion 33-2, the second display portion comprises the front display portion 31, the side display portion 32-1 and the side display portion 32-2.

In addition, in FIG. 3 and FIG. 4, the left boundary and the right boundary of the display panel 12 are the back display portion 33-1 and the back display portion 33-2, which means that the seam of the display panel 12 will be located near the middle part of the back of the display device 10 after the display panel 12 covers the main body 11. However, this disclosure is not limited to this, and the seam position of the display panel can be adjusted according to actual requirements.

Figure 5:
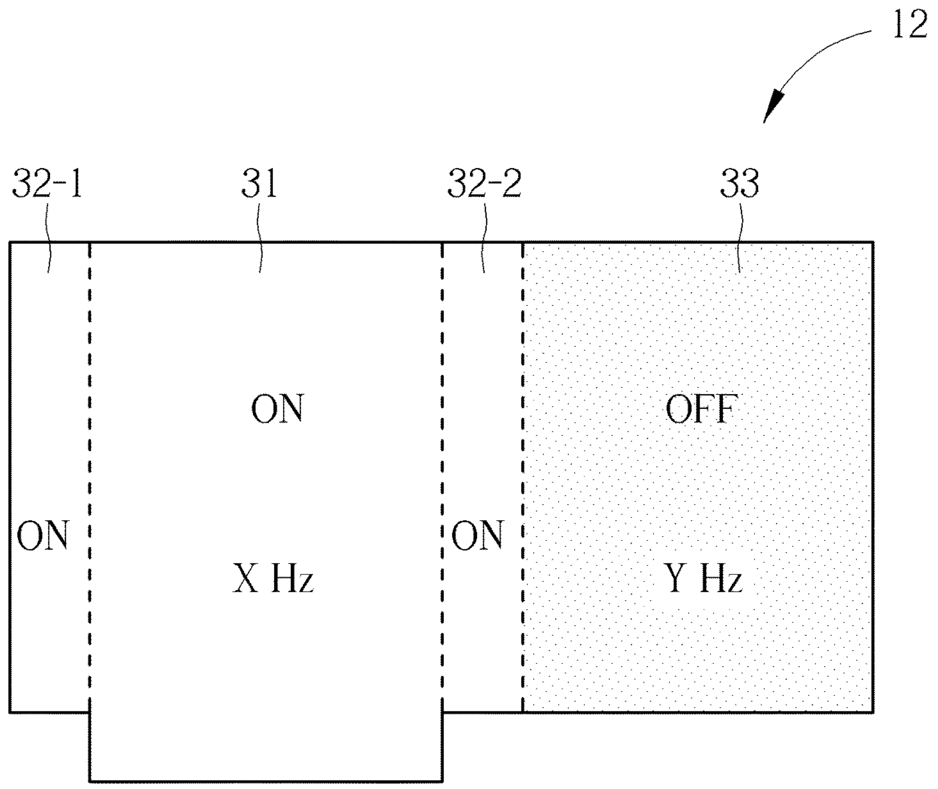
FIG. 5 to FIG. 6 show possible ways for the display device of the present disclosure to achieve the power saving mode.
Figure 6:
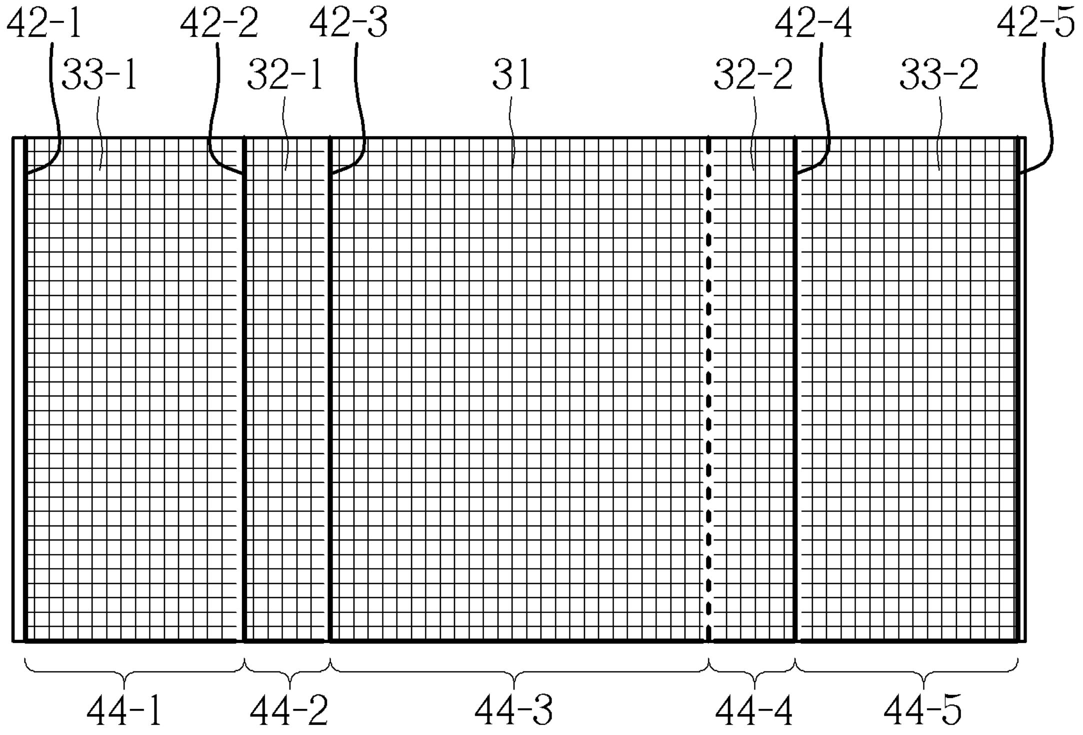

FIG. 5 to FIG. 6 show possible embodiments for the display device of the present disclosure to achieve the power saving mode. As shown in FIG. 5, in this embodiment, if the front display portion 31, the side display portion 32-1 and the side display portion 32-2 operate in the display mode (indicated by "ON" in FIG. 5) and the back display portion 33 operates in the power saving mode (indicated by "OFF" in FIG. 5), the controller can reduce the screen refresh frequency of the back display portion 33 to achieve the purpose of saving power. For example, in this embodiment, the refresh frequency of the front display portion 31 is X Hz, and the refresh frequency of the back display portion 33 is Y Hz, and x>y. For example, the refresh frequency of the front display portion 31 is 60 Hz, and the refresh frequency of the back display portion 33 is 1 Hz (that is, it is updated once every second, which can be used as a display clock), but not limited to this.

Besides, in this embodiment, the left boundary and the right boundary of the display panel 12 are the side display portion 32-1 and the back display portion 33, which means that the seam of the subsequent display panel 12 will be located at the junction of the side display portion 32-1 and the back display portion 33. However, the present disclosure is not limited to this, and the seams of the display panel 12 can be adjusted according to actual requirements.

Another embodiment for the display device of this disclosure to achieve the power saving mode is to give a predetermined gray level (such as a low gray level or zero gray level) to the second display portion (the part requiring the power saving mode), in other words, to reduce the display light source of the second display portion. It is worth noting that the "low gray level" mentioned here can be expressed as the gray level number lower than ⅛ of the total number of gray levels in the gray level table. For example, if there are a total of 256 gray levels in the gray level table, numbered from 0 to 255 from dark to bright, and ⅛ of the total number of 256 gray levels is 32, that is, the gray levels numbered from 0 to 31 in the gray level table belong to the low gray levels represented in this embodiment. When the total number of gray levels in the gray level table is increased, for example, to a total of 512 gray levels, the number of gray levels less than ⅛ of the total is still taken as the low gray level represented by this disclosure. The 0 gray level mentioned here can be expressed as the lowest gray level.

FIG. 6 shows another embodiment of achieving the power saving mode of the display device of the present disclosure. As shown in FIG. 6, different display portions can be controlled by different gate drivers and different data drivers to achieve the effect of sectional display state. In detail, please refer to FIG. 6, the display panel 12 can be divided into five display portions, including a front display portion 31, a side display portion 32-1, a side display portion 32-2, a back display portion 33-1 and a back display portion 33-2. Each display portion is driven by a gate driver and a data driver respectively. Taking FIG. 6 as an example, a gate driver 42-1, a gate driver 42-2, a gate driver 42-3, a gate driver 42-4 and a gate driver 42-5 are arranged from left to right beside each display portion (for example, the left side), and the above-mentioned gate drivers can be connected with corresponding scanning lines to drive each display portion. And a data driver 44-1, a data driver 44-2, a data driver 44-3, a data driver 44-4 and a data driver 44-5 are also arranged from left to right, for example, below each display portion, the data drivers can be connected with corresponding data lines to provide display data to each display portion. In this embodiment, each display portion is divided by a corresponding gate driver (such as one of the gate driver 42-1, the gate driver 42-2, the gate driver 42-3, the gate driver 42-4 and the gate driver 42-5) and a corresponding data driver (such as one of the data driver 44-1, the data driver 44-2, the data driver 44-3, the data driver 44-4 and the data driver 44-5) For example, the front display portion 31 is driven by the gate driver 42-3 and the data driver 44-3. When a specific display portion needs to emit light for display, the data driver of that portion (such as the data driver 44-3) will give a signal, and the gate driver of that portion (such as the gate driver 42-3) will scan, thus turning ON the display portion. While other display portions can be turned OFF, and both the data driver and the gate driver can stop operating, so as to achieve the purpose of saving power.

Figure 7:
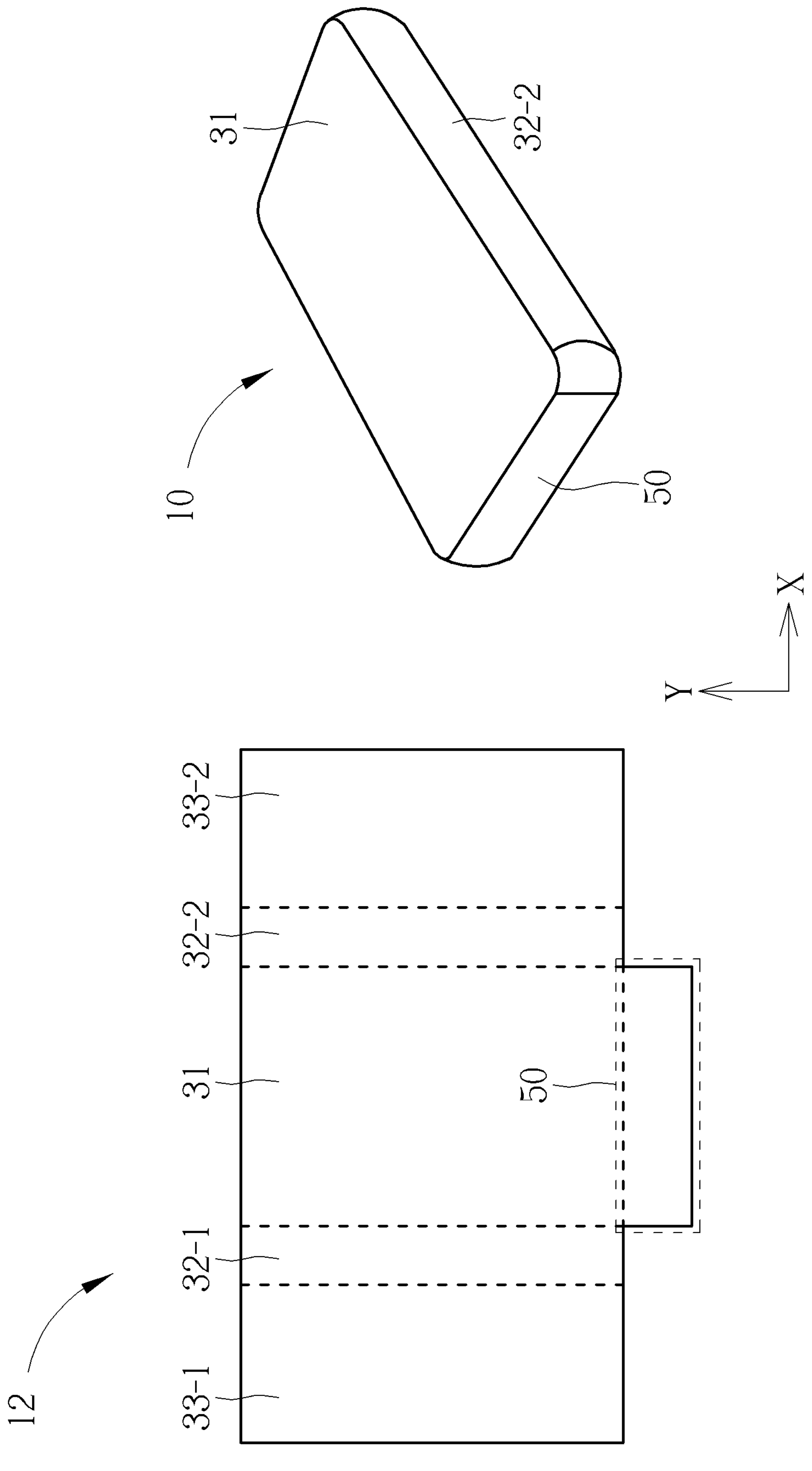
FIG. 7 shows another embodiment of the display device of the present disclosure.

FIG. 7 shows another embodiment of the display device of the present disclosure. The left side of FIG. 7 shows an embodiment of a display panel in the present disclosure, and the right side of FIG. 7 shows a schematic diagram of the display panel covering the display device. As shown in FIG. 7, in order to increase the screen ratio of the front of the display device 10, the length of the front display portion 31 (e.g., the length in the Y-axis) may be increased in this embodiment, so that a specific portion of the front display portion 31 (such as the protruding portion 50 of the left display panel 12 shown in FIG. 7) exceeds other display portions. Subsequently, the display panel 12 is combined with the main body of the display device 10, and the protruding portion 50 can be folded to the other side (for example, the lower side) of the display device 10. In this way, the front of the display device may have the full screen display performance. In addition, the shape of the display panel 12 is not limited to that shown in this embodiment, but can be adjusted according to actual requirements.

Figure 8:
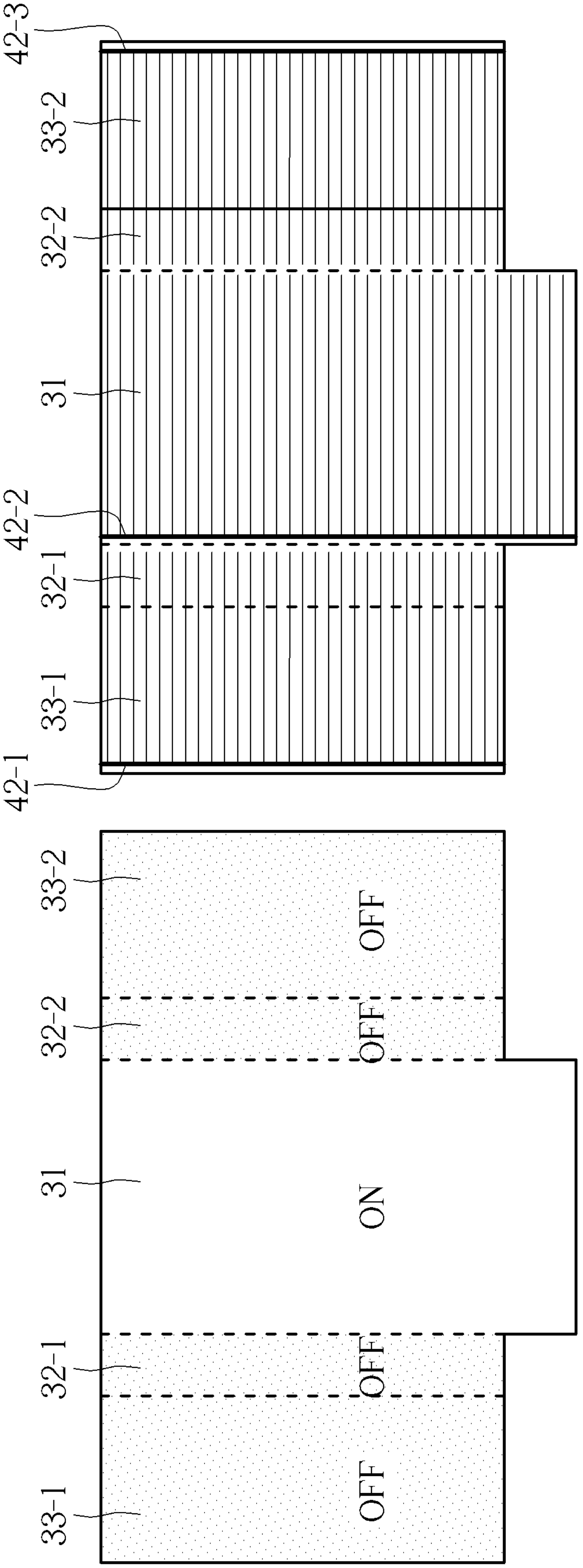
FIG. 8 and FIG. 9 illustrate other embodiments of the display device of the present disclosure.
Figure 9:
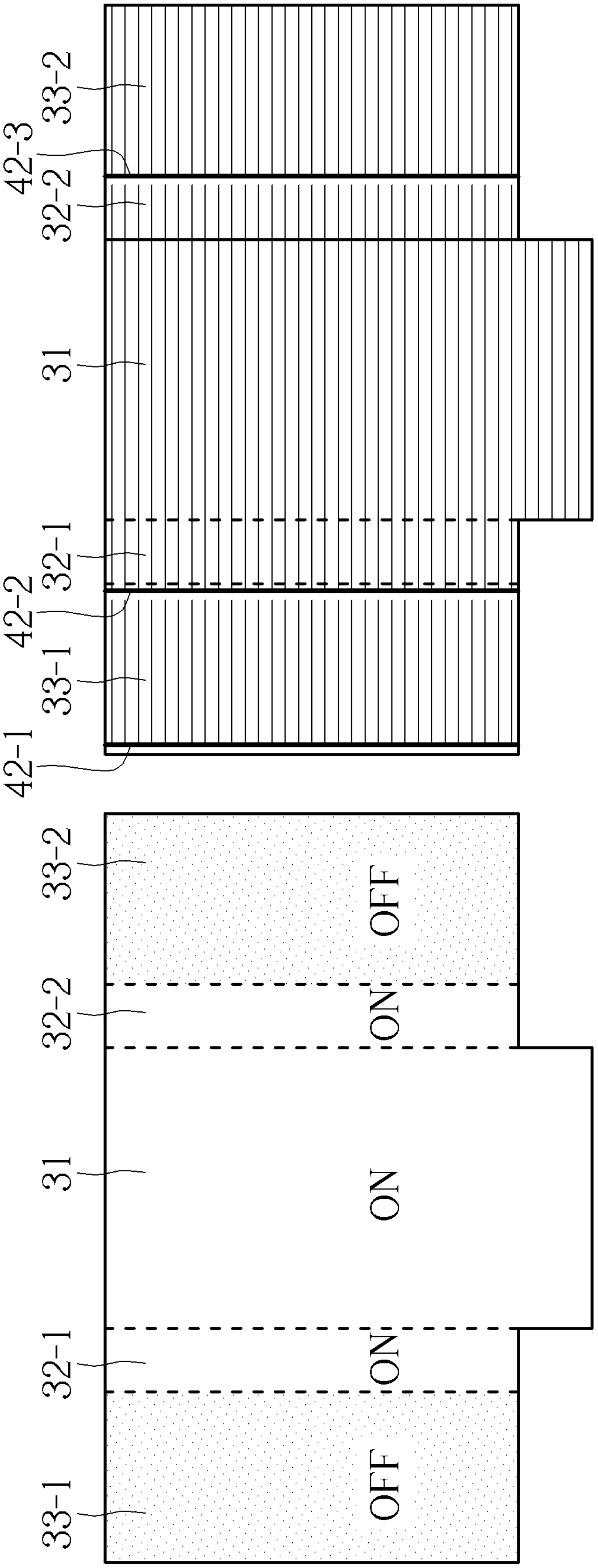

FIG. 8 and FIG. 9 illustrate other embodiments of the display device of the present disclosure. Please also refer to FIG. 6 mentioned above, as shown in FIG. 8, in this embodiment, a plurality of gate drivers (such as the scan lines) and a plurality of data drivers (such as the data lines) are used to drive different display portions respectively. However, according to different requirements, some display portions and their adjacent display portions can share the same gate drive line, thus saving the number of gate drive lines. The difference between this embodiment and the embodiment shown in FIG. 6 is that the display panel 12 in FIG. 8 includes three gate drivers 42-1, gate drivers 42-2 and gate drivers 42-3 arranged from left to right, the gate driver 42-1 corresponds to the back display portion 33-1 and the side display portion 32-1; the gate driver 42-2 corresponds to the front display portion 31; the gate driver 42-3 corresponds to the back display portion 33-2 and the side display portion 32-2. In this embodiment, the back display portion 33-1 and the side display portion 32-1 share one same gate driver 42-1, so the ON or OFF states of these two display portions will be the same (that is, when the back display portion 33-1 is ON, the side display portion 32-1 is also ON, and vice versa). In the same way, the back display portion 33-2 and the side display portion 32-2 share the same gate driver 42-3, so the ON or OFF states of the two portions are the same. One possibility of the display performance of the display device of this embodiment is also shown on the left side of FIG. 8.

Referring to FIG. 9, the difference between this embodiment and the embodiment shown in FIG. 6 is that the display panel 12 in FIG. 9 includes three gate drivers: the gate driver 42-1, the gate driver 42-2 and the gate driver 42-3, arranged from left to right, the gate driver 42-1 corresponds to the back display portion 33-1, the gate driver 42-2 corresponds to the front display portion 31, the side display portion 32-1 and the side display portion 32-2, the gate driver 42-3 corresponds to the back display portion 33-2. In this embodiment, the front display portion 31, the side display portion 32-1 and the side display portion 32-2 share the same gate driver 42-2, so the ON or OFF states of the three portions will be the same (that is, when the front display portion 31 is ON, the side display portion 32-1 and the side display portion 32-2 are also ON, and vice versa). One possibility of the display performance of the display device of this embodiment is also shown on the left side of FIG. 9.

Except for the arrangement of the gate drivers and the data drivers shown in FIG. 6, FIG. 8 and FIG. 9, there are other possibilities for the arrangement of the gate drivers and the data drivers of the display panel of the present disclosure. For example, the whole display panel may include one data driver (one-sided driving) located on one side of the display panel, or two data drivers (two-sided driving) located on the left and right sides of the display panel respectively, and the switching signals of each display portion (display area) are controlled by different data drivers (different data lines). For example, some screen areas that need to be turned OFF are given low gray level or zero gray level. The above structure also within the scope of this disclosure.

When the display device of this disclosure is applied to handheld electronic devices such as mobile phones and tablet computers, the front display portion, the side display portion and the back display portion of this disclosure may all have touch control functions. In order to prevent the user from touching the side display portion or the back display portion by mistake (i.e. mistouching the display panel) during use, this disclosure provides several methods to avoid accidental touch, please refer to the following FIG. 10 to FIG. 12.

Figure 10:
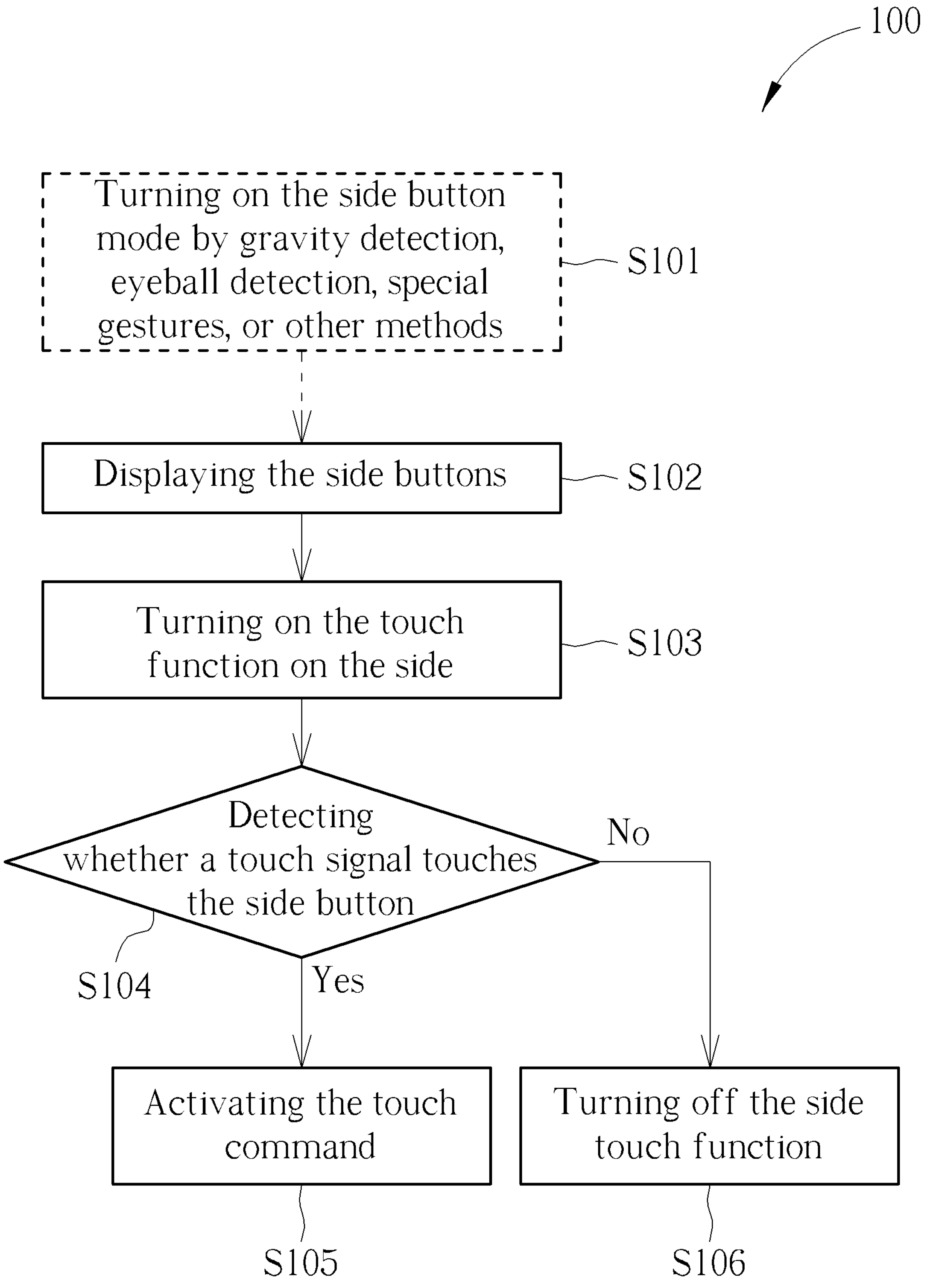
FIG. 10 shows a method to avoid mistouching the display panel of the present disclosure.

FIG. 10 shows a method to avoid mistouching the display panel. In the following methods shown in FIG. 10 to FIG. 12 of this embodiment, it is assumed that the user is watching the front side of the display device, while the side and back side of the display device are in a power saving mode (for example, closing part of the screen area, keeping part of the screen area in low gray level or in low refresh frequency). As shown in FIG. 10, the method 100 includes: step S101: turning on the side button mode by gravity detection, eyeball detection, special gestures, etc.; Next, step S102: displaying the side buttons; Then proceed to step S103: turning on the touch function on the side; Then, step S104: detecting whether a touch signal touches the side button. If the determination result in step S104 is positive (yes), proceed to step S105: activating the touch command, for example, the user can touch the side button to switch the display direction (from the front display to the back display, etc.); If the determination result in step S104 is negative (no), it means that the user may mistouch the display panel, and then proceed to step S106: turning off the side touch function.

Figure 11:
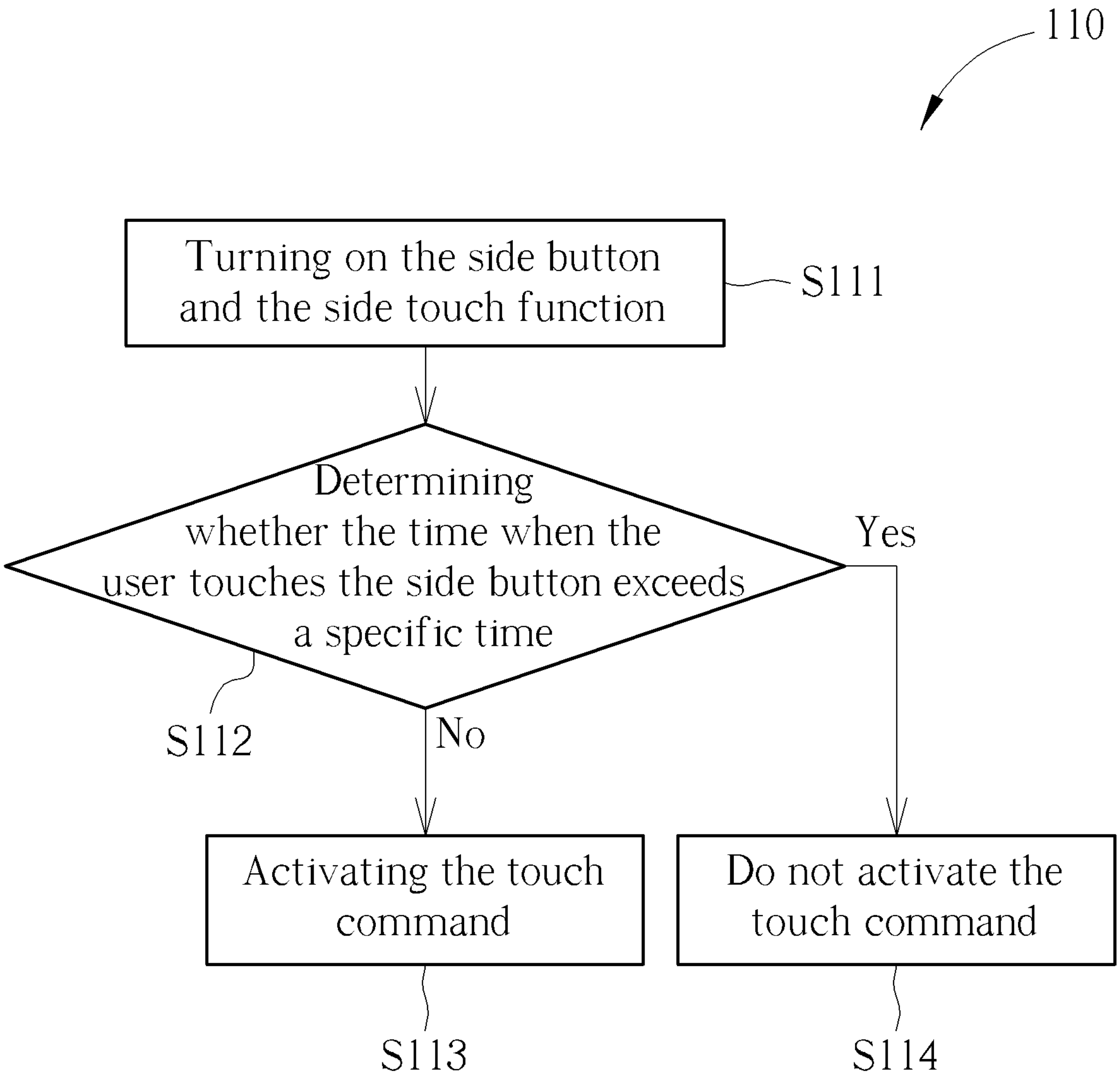
FIG. 11 shows another method to avoid mistouching the display panel of the present disclosure.

FIG. 11 shows another method to avoid mistouching the display panel of the present disclosure. In this embodiment, the method 110 includes: firstly, performing step S111: turning on the side button and the side touch function. reference can be made to the above steps S101 to S103, that is to say, the side button mode can be turned on by gravity detection, eyeball detection, special gestures, etc., or in other embodiments, the side button and side touch function can be kept on by default. Then, step S112 is performed to determine whether the time when the user touches the side button exceeds a specific time, such as 5 seconds or other time. If the determination result is negative (no), it means that the user touches the button and releases it quickly, and it is determined that the user does perform the "touch" action, so step S113 is performed to activate the touch command. On the contrary, if the determination result in step S112 is positive (yes), it means that the user may touch the side touch button continuously only because the user is holding the device in the user's hand, so it can be determined that the touch button is mistouched, and then step S114 is performed: the touch command is not activated.

Figure 12:
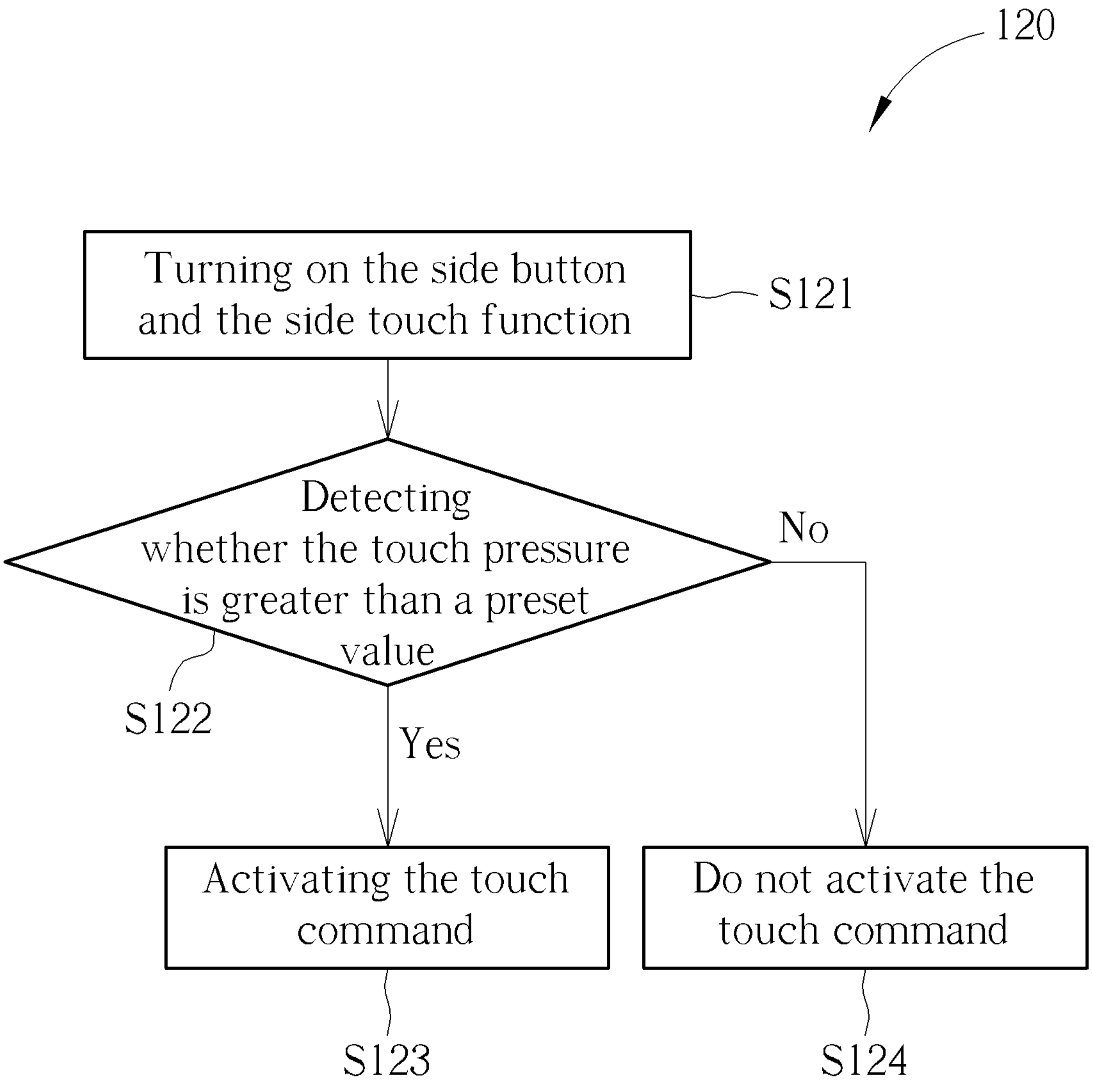
FIG. 12 shows another method to avoid mistouching the display panel of the present disclosure.

FIG. 12 shows another method to avoid mistouching the display panel of the present disclosure. In this embodiment, the method 120 includes: firstly, performing step S121: turning on the side button and the side touch function. In this step, reference can be made to the above steps S101 to S103, that is to say, the side button mode can be turned on by gravity detection, eyeball detection, special gestures, etc., or in other embodiments, the side button and side touch function can be kept on by default. Next, step S122 is performed to detect whether the touch pressure is greater than a preset value, for example, to determine whether the user presses the touch button with sufficient force, and if the determination result is positive (yes), step S123 is performed to activate the touch command. On the contrary, if the determination result in step S122 is negative (no), it means that the user may only touch the side touch button slightly because the user is holding the device in the user's hand, so it can be determined that the touch button is mistouched, and then step S124 is performed: the touch command is not activated.

In summary, the present disclosure is characterized in that the display panel is divided into different portions, for example, at least a first display portion and a second display portion, and the different display portions have the function of sectional display state, that is, one of them operates in a display mode (for example, a normal display state), while the other operates in a power saving mode (for example, closing the picture, giving low gray level or zero gray level, reducing the update frequency, etc.). Therefore, the power consumption of the whole display panel can be effectively reduced.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device, comprising:

a first display portion having a first surface;

a second display portion having a second surface not in a same plane with the first display portion; and a side display portion having a third surface, wherein the first display portion and the second display portion are corresponding to the opposite sides of the side display portion; and a main body, wherein the first display portion, the second display portion and the side display portion are disposed on the main body;

wherein the first surface, the second surface and the third surface have a normal respectively, and the normal of the first surface, the normal of the second surface and the normal of the third surface face different directions respectively, and an end portion of the main body comprises a curved shape, wherein the second display portion has a lower refresh frequency to save power.

2. The display device according to claim 1, wherein the main body is a soft component.

3. The display device according to claim 1, wherein the main body is bent together with the side display portion.

4. The display device according to claim 1, wherein the main body comprises a casing of a mobile phone, a processor, a battery, a touch device or an e-paper.

5. The display device according to claim 1, wherein the main body comprises a curved portion corresponds to the side display portion.

6. The display device according to claim 1, wherein the side display portion comprises two terminals, and the two terminals are separated from a distance.

7. The display device according to claim 6, wherein the two terminals respectively connected with the first display portion and the second display portion.

8. The display device according to claim 1, wherein a material of the first display portion comprises glass, copper foil, polyimide (PI), polycarbonate (PC), polyethylene naphthalate (PEN), triacetate (TAC), epoxy resin or their combination.

9. The display device according to claim 1, further comprising a protruding portion connected to the first display portion.

10. The display device according to claim 9, wherein the protruding portion is folded to a side surface of the main body.

11. The display device according to claim 9, wherein the main body having a front surface, a back surface opposite to the front surface and a side surface, wherein the protruding portion is folded to the side surface and the back surface of the main body.

* * * * *